United States Patent [19]
Vaneerdewegh et al.

[11] Patent Number: 6,018,222
[45] Date of Patent: Jan. 25, 2000

[54] DYNAMIC FOCUSING CIRCUIT FOR A CRT AND DISPLAY APPARATUS INCORPORATING SAME

[75] Inventors: Franky M. M. E. Vaneerdewegh; Robert C. C. Van Der Sanden, both of Eindhoven, Netherlands

[73] Assignee: U.S. Philips Corporation, New York, N.Y.

[21] Appl. No.: 09/075,678
[22] Filed: May 11, 1998
[30] Foreign Application Priority Data Jun. 6, 1997 [EP] European Pat. Off. .............. 97201719

[51] Int. Cl.[7] ...................................................... G09G 1/04
[52] U.S. Cl. ...................... 315/382; 315/382.1; 315/405; 315/408
[58] Field of Search ................................. 315/382, 382.1, 315/371, 405, 399, 408

[56] References Cited

U.S. PATENT DOCUMENTS

| | | | |
|---|---|---|---|
| 4,472,662 | 9/1984 | Freed | 315/399 |
| 4,622,498 | 11/1986 | Lester | 315/382 |
| 5,036,259 | 7/1991 | Sutton et al. | 315/382 |
| 5,043,638 | 8/1991 | Yamashita | 315/382.1 |
| 5,146,142 | 9/1992 | Van Tol | 315/382 |
| 5,162,705 | 11/1992 | Golik | 315/382 |
| 5,430,358 | 7/1995 | George | 315/382 |
| 5,486,741 | 1/1996 | George | 315/382 |
| 5,633,581 | 5/1997 | Takatori | 323/354 |
| 5,780,978 | 7/1998 | Bang | 315/382.1 |

FOREIGN PATENT DOCUMENTS 2095943 10/1982 United Kingdom.

Primary Examiner—Haissa Philogene
Attorney, Agent, or Firm—John C. Fox

[57] ABSTRACT

The invention relates to a dynamic focusing circuit with an output (1) for supplying a dynamic focusing voltage (Vf) to a focus electrode of a cathode ray tube (CRT). The dynamic focusing voltage (Vf) has, in succession, a falling edge, an almost flat part and a rising edge. A first transistor (T1) has a main current path (c1, e1) coupled between a supply voltage (V+) and the output (1). An arrangement of a secondary winding (Ls) of a transformer (T) and a current determining circuit (12) is coupled between the control input (b1) of the first transistor (T1) and the output (1). The current determining circuit (12) supplies a bias current (Ib). A second transistor (T2) has a control electrode (b2) for receiving an input voltage (Vi) related to a parabolically shaped input waveform (Vin), and a main terminal (c2) coupled to the control input (b1) of the first transistor to withdraw current (Id) from the control input (b1). The secondary winding (Ls) supplies a voltage superposed on the dynamic focusing voltage (Vf). The voltage supplied by the secondary winding (Ls) and the current determining circuit (12) are dimensioned so as to minimize dissipation for driving the first transistor (T1). Further the floating secondary winding (Ls) causes the first transistor (T1) to be conducting during the flat part of the dynamic focusing voltage (Vf), thereby minimizing delay of the rising edge of the dynamic focusing voltage (Vf).

7 Claims, 3 Drawing Sheets

DYNAMIC FOCUSING CIRCUIT FOR A CRT AND DISPLAY APPARATUS INCORPORATING SAME

BACKGROUND OF THE INVENTION

The invention relates to a dynamic focusing circuit as defined in the precharacterizing part of claim 1. The invention also relates to a display apparatus comprising such a dynamic focusing circuit.

Such a dynamic focusing circuit is especially suitable for supplying a parabolically shaped dynamic focusing voltage with a high repetition rate to a focus electrode of a picture tube. Parabolically shaped should be understood to include any waveform having a falling edge, a somewhat flat part and a rising edge, successively.

U.S. Pat. No. 5,036,259 describes a dynamic focusing system for a cathode ray tube (CRT). The dynamic focusing system generates a parabola like dynamic focusing voltage which has a falling edge, a more or less flat part and a rising edge. A first npn transistor has a collector connected to a high supply voltage, an emitter connected to a focus electrode of the CRT via a capacitor, and a base connected via a series arrangement of two resistors to the high supply voltage. A bootstrap capacitor is arranged between the emitter of the first transistor and the junction of the two resistors. A second transistor has a collector connected to the base of the first transistor to draw a current away from the base of the first transistor in response to a waveform supplied between the base and the emitter of the second transistor. A diode has an anode connected to the emitter of the first transistor and a cathode connected to the base of the first transistor. During the flat part of the focusing voltage, the two resistors supply a bias current to the base of the first transistor. The bias current originates from the high supply voltage. The bootstrap capacitor is charged to a predetermined voltage. During the falling edge of the focusing voltage, the second transistor withdraws the bias current supplied by the resistors from the base of the first transistor, and the diode starts conducting thereby lowering the focusing voltage. When the diode is conducting, the first transistor inherently is non-conducting. During the rising edge of the focusing voltage the second transistor withdraws less current from the base of the first transistor. The bias current supplied via the resistors will flow into the base of the first transistor which starts conducting. The focusing voltage starts to rise. The voltage across the bootstrap capacitor initially stays the same. Consequently, the bias current supplied via the resistor between the capacitor and the base of the first transistor has the same value although the voltage across the series arrangement of the resistors decreases substantially. The dissipation in the resistors has been lowered significantly by using the bootstrap capacitor. In the prior art, the values of the resistors need to be selected so low that the required base current at a high value of the focusing voltage can be supplied. Such low values of the resistors result in a very high current and thus dissipation in the resistors at low focusing voltages as occur during the flat part of the focusing voltage.

It is a drawback of the prior art focusing circuit that the first transistor is non-conducting at the beginning of the rising edge of the focusing voltage. This causes a delayed rise of the focusing voltage and thus a non-optimal focusing of the electron beam on the screen of the CRT. The delayed rise of the focusing voltage can be minimized by enlarging the bias current, but this causes an unwanted increase of the dissipation in the series arrangement of the resistors. It is a further drawback of the prior art focusing circuit that, although the dissipation in the series arranged resistors has been lowered considerably by adding a bootstrap capacitor, it is still high.

OBJECTS AND SUMMARY OF THE INVENTION

It is an object of the invention to provide a dynamic focusing circuit having an improved efficiency without deteriorating the shape of the dynamic focusing voltage.

To this end, a first aspect of the invention provides a dynamic focusing circuit as defined in claim 1. A second aspect of the invention provides a display apparatus as defined in claim 7.

In the dynamic focusing circuit according to the invention, the series arrangement of the resistors and the bootstrap capacitor are omitted. An arrangement of a secondary winding of a transformer and a current determining circuit is coupled between the control input of the first transistor and the output of the dynamic focusing circuit. In this way, the voltage across the current determining circuit only depends on the voltage generated by the secondary winding. The loop comprising the secondary winding, the current determining circuit, the control input of the first transistor, and the main terminal of the first transistor which is coupled to the output of the dynamic focusing circuit tracks with the voltage on the output of the dynamic focusing circuit. As the main terminal of the first transistor is coupled to the output of the dynamic focusing circuit, the current determining circuit receives an input voltage from the secondary terminal of the secondary winding which has a substantial constant value with respect to the voltage on the control input of the first transistor. In this way the bias current can be generated very efficiently by selecting a voltage across the secondary winding which fits in optimally with the current determining circuit to supply the required bias current.

In the prior art, one of the resistors is connected to the high output voltage and needs to supply the bias current and a charge current to the bootstrap capacitor. The dissipation in this resistor is inherently high.

On the other hand, in the dynamic focusing circuit according to the invention, the first transistor is advantageously conducting at the beginning of the rising edge of the dynamic focusing voltage. This is explained in the following. Let us assume that a second terminal of the secondary winding supplies a current via the current determining circuit to the control input of the first transistor. This bias current has to return to a first terminal of the secondary winding. As the dynamic focusing voltage is nearly constant before it reaches the rising edge, no current flows to the focus electrode. The bias current may only flow via the control input to the main terminal of the first transistor and then back to the first terminal of the secondary winding, or via the main terminal of the second transistor to a power supply terminal. In the first situation, wherein current flows into the control terminal of the first transistor, the first transistor inherently is conductive. In the second situation the current which flows into the power supply terminal will flow through a main power supply which also generates the high voltage. This current can only flow back to the first terminal of the secondary winding via the main current path of the first transistor. So, also in this situation, the first transistor has to be conductive. This has the advantage that the bias current can be selected to be low as no extra bias current is required to prevent a delayed rise of the rising edge of the dynamic focusing voltage. The current determining circuit may comprise a rectifier element for rectifying the AC voltage supplied by the secondary winding and a resistor arranged between a free end of the rectifier element and the control input of the first transistor. Other embodiments of the current determining circuit are described with respect to the dependent claims.

In an embodiment of the invention as defined in claim 3, the second transistor is a part of a feedback loop to generate a dynamic focusing voltage which resembles the parabolically shaped input voltage very accurately.

In an embodiment of the invention as defined in claim 4, the third transistor and the voltage divider form a current source for supplying the bias current. The rectified voltage supplied by the secondary winding and the values of the components used can be optimally selected to obtain a low dissipation. In the prior art, the values of the resistors, which are arranged in series, and the bootstrap capacitor have to be selected on the basis of the high supply voltage, the maximum amplitude of the dynamic focusing voltage, and the highest repetition frequency of the dynamic focusing voltage. This high supply voltage has to be selected so that it is at least as high as the maximum focusing voltage which, for example, may be up to 2 kV.

In an embodiment of the invention as defined in claim 5, a capacitor is arranged between the tap of the voltage divider and a reference voltage. The reference voltage may be a terminal of a power supply voltage source, for example ground. The capacitor increases the bias current during the rising edge of the focusing voltage by retarding an increase of the voltage on the control input of the third transistor, while the voltage on the second terminal of the secondary winding increases without delay. This has the advantage that the bias current supplied by the current source increases during the rising edge of the focusing voltage, and the bias current supplied during the other parts of the focusing voltage is not larger than strictly required. Thus, the dissipation is lowered.

These and other aspects of the invention will be apparent from and elucidated with reference to the accompanying drawings.

DESCRIPTION OF THE PREFERRED EMBODIMENTS

Figure 1:
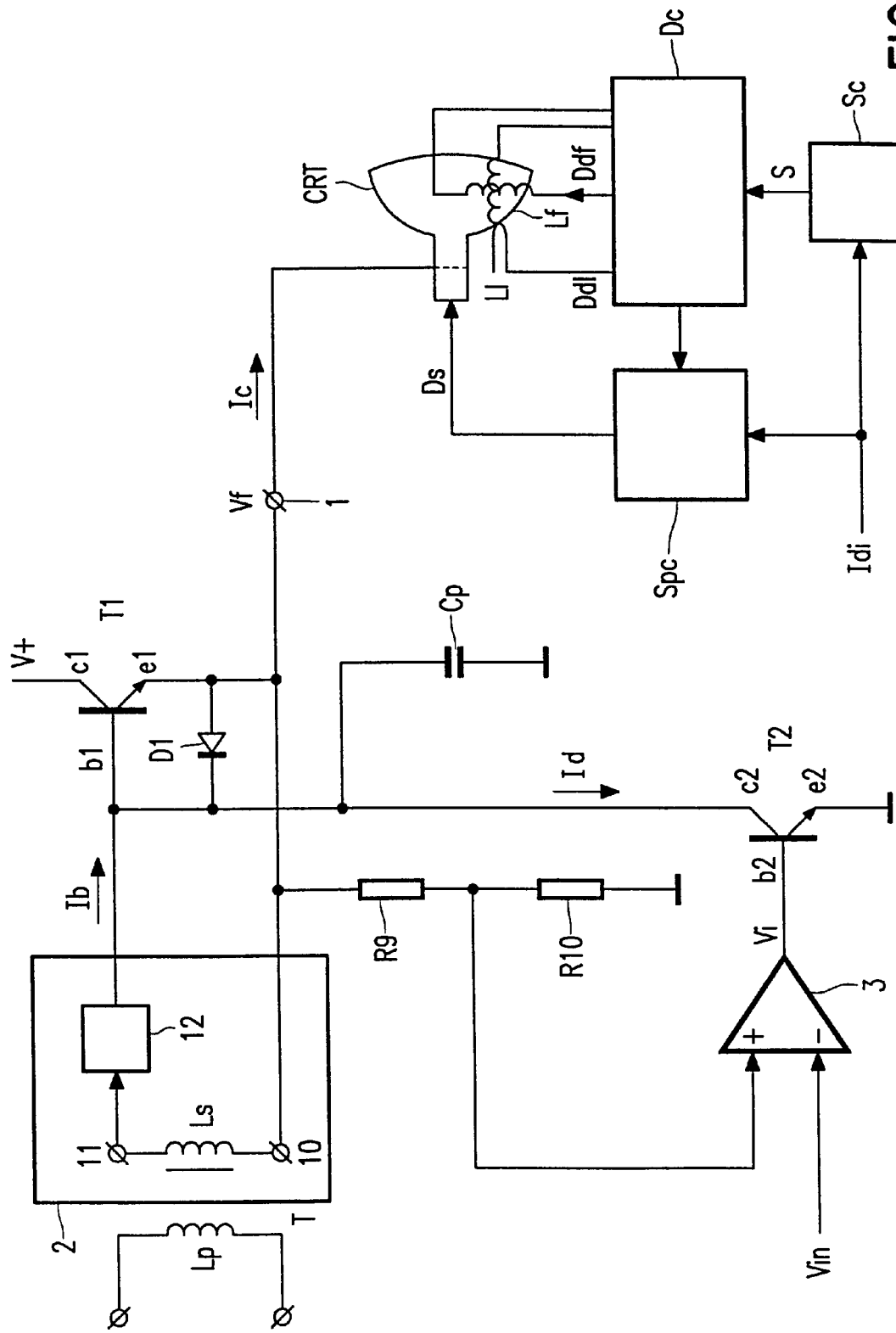
FIG. 1 shows a basic diagram of a display apparatus comprising a dynamic focusing circuit according to the invention.
Figure 2:
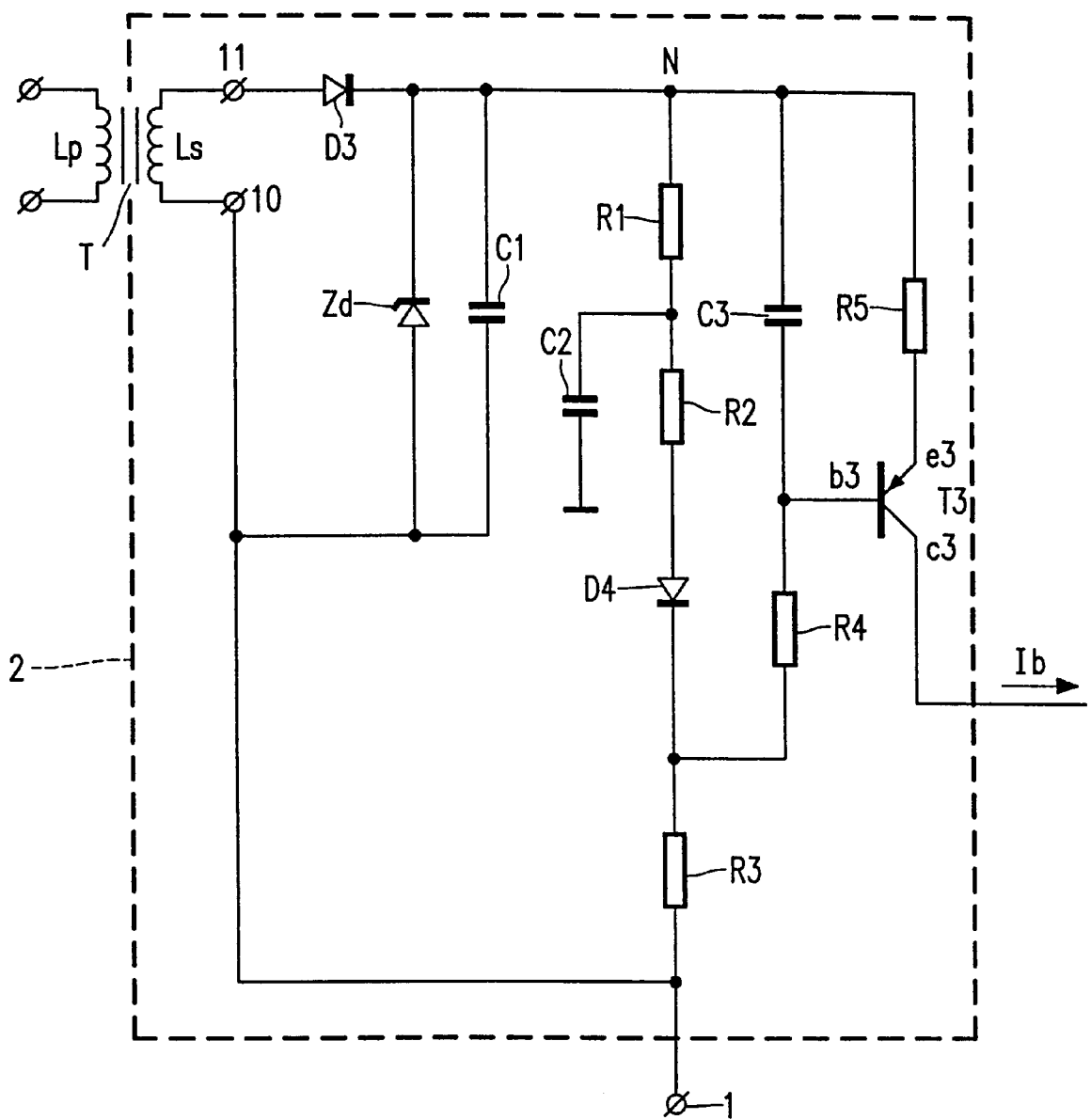
FIG. 2 shows a circuit diagram of a preferred embodiment of the current supplying circuit which is part of the dynamic focusing circuit according to the invention.

FIG. 1 shows a basic diagram of a display apparatus comprising a dynamic focusing circuit according to the invention. A signal processing circuit Spc processes incoming display information Idi to obtain a display signal Ds suitable to drive the cathode ray tube CRT such that the display signal is displayed on the screen of the cathode ray tube CRT. A deflection circuit Dc generates deflection drive signals Dd1,Ddf to drive deflection coils L1,Lf for deflecting an electron beam in the cathode ray tube CRT in a line and a field direction, respectively. A synchronisation circuit Sc generates synchronisation signals S from the incoming display information Idi. The synchronisation signals S are supplied to the deflection circuit Dc for synchronising the deflection drive signals Dd1,Ddf to obtain a desired position of the display signal Ds on the cathode ray tube CRT. The dynamic focusing circuit has an output 1 for supplying a dynamic focusing voltage Vf to a focus electrode of the cathode ray tube CRT. A first transistor T1 has a main current path c1,e1 which is connected between a high supply voltage V+ and the output 1. If, as shown, the first transistor T1 is a npn transistor, the collector c1 is connected to the supply voltage V+ and the emitter e1 is connected to the output 1. A current supplying circuit 2 has an output connected to a control input b1 of the first transistor T1 to supply a bias current Ib. A second transistor T2 has a control electrode b2 to receive an input voltage Vi, and a main terminal c2 connected to the control input b1 to withdraw current Id from the control input b1. If, as shown, the second transistor T2 is a npn transistor, the collector c2 is connected to the control input b1 of the first transistor T1, and an emitter e2 is connected to ground. A diode D1 has an anode connected to the output 1, and a cathode connected to the collector c2 of the second transistor T2. A parasitic capacitor Cp is shown as being connected between the collector c2 of the second transistor T2 and ground. This parasitic capacitor Cp is a lump representation of parasitic capacitances of the components connected to the line between the control input b1 and the main terminal c2 together with the capacitance of the conductors between these components. The current supplying circuit 2 comprises a secondary winding Ls of a transformer T, and a current determining circuit 12. The secondary winding Ls has a first terminal 10 connected to the output 1, and a second terminal 11 connected to an input of the current determining circuit 12. The current determining circuit 12 may comprise a series arrangement of a rectifier element and a resistor. A preferred embodiment of the current determining circuit 12 is shown in FIG. 2. The dynamic focusing circuit may comprise a differential amplifier 3 with a first input receiving a parabolically shaped input waveform Vin, a second input coupled via a resistor R9 to the output 1 and via resistor R10 to ground, or to a reference voltage which may be a DC voltage or a modulated voltage (for example, for a frame frequent modulation of the dynamic focusing voltage Vf) for receiving a tapped-in dynamic focusing voltage, and an output coupled to the control input b2 of the second transistor T2 to supply the input voltage Vi. The input voltage Vi is the parabolically shaped input waveform Vin if no feedback loop 3,R9,R10 is required. The operation of the dynamic focusing circuit is elucidated in the following.

Figure 3:
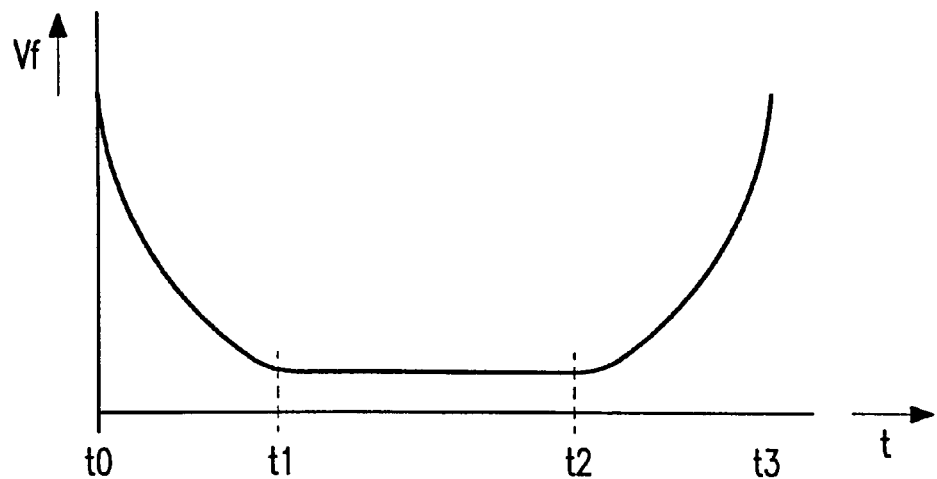
FIG. 3 shows a waveform of the dynamic focusing voltage.

As shown in FIG. 3, the dynamic focusing voltage Vf has a falling edge during a period t0 to t1, a more or less flat part during a period t1 to t2, and a rising edge during a period t2 to t3. The dynamic focusing voltage may be a second order (parabola), a fourth order (bath tub), or a higher even-order polynomial. The falling and rising edges may also be straight lines. The input voltage Vin has the same shape as the dynamic focusing voltage Vf. During the falling edge, the second transistor T2 is conducting. The dynamic focusing voltage Vf decreases as a current Ic is drawn from the focus electrode (which behaves as a capacitor) via the diode D1. As diode D1 is conducting, transistor T1 is non-conducting.

During the flat part of the dynamic focusing voltage Vf, the first transistor T1 is conducting. The second terminal 11 of the secondary winding Ls supplies an input current via the current determining circuit 12 to the control input b1 of the first transistor T1. This input current has to return to the first terminal 10 of the secondary winding Ls. As the dynamic focusing voltage Vf is nearly constant, no current flows to the focus electrode. The input current may flow via the control input b1 to the main terminal e1 of the first transistor T1 and then back to the first terminal 10 of the secondary winding Ls. Alternatively, if it is assumed that the input current is zero, the bias current flows via the main terminal c2 of the second transistor T2 to a power supply terminal. In the first situation wherein current flows into the control terminal b1 of the first transistor T1, the first transistor T1 inherently is conducting. In the second situation the current which flows into the power supply terminal will flow through a main power supply which also generates the high voltage V+. This current can only flow back to the first terminal 10 of the secondary winding Ls via the main current path (c1,e1) of the first transistor T1. So, also in this situation, the first transistor T1 has to be conducting and the assumption that the input current is zero is not correct. As the first transistor T1 is conducting during the flat part of the dynamic focusing voltage Vf, no delay occurs at the start of the rising edge of the dynamic focusing voltage Vf. Consequently, there is no need to increase the bias current Ib to prevent a delayed rise of the rising edge of the dynamic focusing voltage Vf. This lowers the dissipation.

During the rising edge of the dynamic focusing voltage Vf, the second transistor T2 gradually draws less current Id from the control terminal b1 of the first transistor T1. The first transistor T1 becomes more and more conducting and the dynamic focusing voltage Vf rises. The voltage at the second terminal 11 of the secondary winding Ls tracks with the dynamic focusing voltage Vf. As the main terminal e1 of the first transistor T1 is connected to the output 1 of the dynamic focusing circuit, the current determining circuit 12 receives an input voltage from the second terminal 11 which has a substantially constant value with respect to the voltage on the control input b1 of the first transistor T1 (as long as the first transistor T1 is conducting), independent of the actual value of the dynamic focusing voltage Vf. In this way, the bias current Ib is generated very efficiently by selecting a voltage across the secondary winding Ls which fits in optimally with the current determining circuit 12 to supply the required bias current Ib.

It is assumed that the total capacitance at the focus electrode is Cf=60 pF. This total capacitance Cf comprises the capacitance of the focus electrode itself and parasitic capacitance of conductors and components (for example the first and the second transistor) connected to the focus electrode. If the dynamic focusing voltage Vf has a parabolic shape during the rising edge it counts that $Vf=t^2$. The current Ic to be supplied by the first transistor T1 to the focus electrode during the rising edge is approximately:

$$Ic=Cf*dVf/dt=60\ pF*2*1\ kV/4\ \mu s=30\ mA$$

The factor of 2 is caused by differentiating a second order function in time. If the first transistor T1 has a current amplification factor β=10, an input or base current of 3 mA is to be fed into the control input (base) b1 of the first transistor T1. However, at the main terminal c2 of the second transistor T2, a parasitic capacitance Cp of about 6 pF is present. Across this parasitic capacitance Cp, the same rising edge of the dynamic focusing voltage Vf occurs. So, the current fed into the parasitic capacitance Cp is approximately 3 mA. The bias current Ib has to be selected somewhat higher than the sum of the input current and the current fed into the parasitic capacitance Cp to avoid that transistor T2 will become non-conductive (which would cause delay and thus a non-optimal focusing at the beginning of the falling edge). If the voltage across the secondary winding Ls is 8 volts after rectification, and the base emitter voltage of the first transistor T1 is 1 V, a resistor of 1 kohm between the rectifier and the base gives rise to a bias current of 7 mA. The power dissipated in the 1 kohm resistor is approximately 50 mW and thus very low. In the prior art, the resistor connected between the bootstrap capacitor and the base of the first transistor has to supply the 7 mA bias current. As the voltage across the bootstrap capacitor is almost constant, this average current of 7 mA should also be supplied via the resistor connected between the high supply voltage and the bootstrap capacitor. This gives rise to a very large dissipation of about 1200 V * 7 mA=8.4 Watt in this resistor during the flat part of the dynamic focusing voltage because nearly the full high voltage (in this example 1200 volts) occurs across this resistor.

FIG. 2 shows a circuit diagram of a preferred embodiment of the current supplying circuit 2 which is part of the dynamic focusing circuit according to the invention. Elements having the same reference as in FIG. 1 have the same function. The transformer T has a primary winding Lp and a secondary winding Ls. The secondary winding Ls has a first terminal 10 connected to the output 1 of the dynamic focusing circuit, and a second terminal 11 connected to a node N via a rectifier diode D3. A parallel arrangement of a zener diode Zd and a smoothing capacitor C1 is connected between node N and the first terminal 10 of the secondary winding Ls to obtain a stabilized voltage at node N with respect to the first terminal 10. A voltage divider which comprises a series arrangement of a resistor R1, a resistor R2, a diode D4 and a resistor R3 is arranged between node N and the first terminal 10. A capacitor C2 is arranged between a junction of the resistors R1 and R2 and ground. A transistor T3 has a control input (base) b3 connected to a junction of the diode D4 and the resistor R3 via a resistor R4, a main electrode (emitter) e3 connected to node N via a resistor R5, and a main electrode (collector) c3 supplying the bias current Ib.

The dynamic focusing voltage Vf is almost stable during its flat part. The capacitors C2 and C3 exert no influence and the transistor T3 together with the voltage divider acts as a DC current source. In a practical embodiment, the voltage between node N and output 1 is approximately 5 Volts, R1=2.2 kohms, R3=3.3 kohms, R3=18 kohms, and R5=330 ohms, and consequently, the bias current Ib is approximately 3 mA.

During the rising edge of the dynamic focusing voltage Vf, the capacitor C2 enlarges the bias current Ib by retarding an increase of the voltage on the base b3 of the transistor T3, while the voltage at the second terminal 11 of the secondary winding Ls and thus the voltage at the emitter e3 of the transistor T3 increases without delay. This has the advantage that the bias current Ib increases during the rising edge of the focusing voltage Vf, while the bias current supplied during the other parts of the focusing voltage is not larger than strictly required. In a practical embodiment, C2 has a value of 4.1 pF. The resistor R4 and capacitor C3 improve the stability of the circuit. The value of capacitor C3 may not be too large to avoid that the retarded voltage in the voltage divider is prevented to be fed to the base of transistor T3. Practical values of the resistor R4 and the capacitor C3 are: R4=10 kohms, C3=100 pico farads. The operation of the capacitor C2 is explained more in detail below. Across the voltage divider R1,R2,D4,R3 only a DC voltage occurs. With respect to ground potential, all voltages in the voltage divider vary common mode with the dynamic focusing voltage Vf. So, the dynamic focusing voltage Vf occurs across the capacitor C2. The dynamic focusing voltage Vf across the capacitor C2 causes a current through the capacitor C2 which is the derivative of the dynamic focusing voltage Vf. This current flows through an impedance which consists of the parallel arrangement of on the one hand the resistor R1 and on the other hand the series arrangement of the resistors R2 and R3. As the value of the resistor R1 is lower than the value of the resistance of the series arrangement of R2 and R3, the current through the capacitor C2 substantially flows through the resistor R1. Consequently, the voltage at the junction of the resistors R3 and R4 is somewhat lowered during the rising edge of the dynamic focusing voltage Vf, thereby enlarging the bias current Ib. The capacitor C2 has the further advantage that the current supplying circuit 2 supplies a bias current Ib which tracks with the repetition frequency of the dynamic focusing voltage Vf. The current through the capacitor C2 is the derivative of the dynamic focusing voltage Vf. At a low repetition frequency of the dynamic focusing voltage Vf, this derivative is small. The AC current through the capacitor C2 is small, and the bias current Ib is enlarged slightly. At a high repetition frequency of the dynamic focusing voltage Vf, this derivative is large. The AC current through the capacitor C2 is large, and the bias current Ib is enlarged significantly. Thus, the current supplying circuit 2 supplies the right amount of bias current Ib at a large range of repetition frequencies of the dynamic focusing voltage Vf, thereby maximizing the efficiency.

Figure 4:
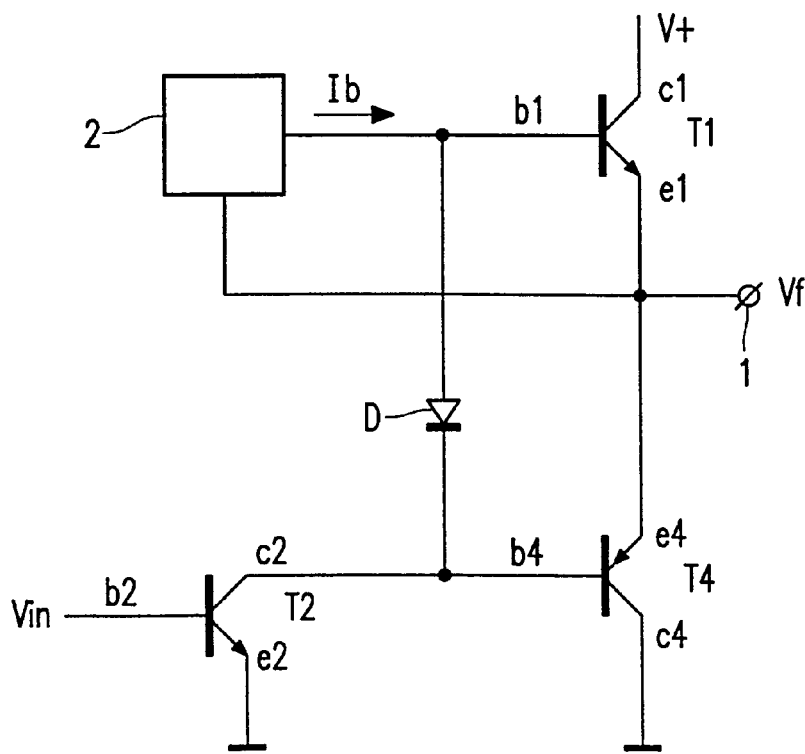
FIG. 4 shows an alternative embodiment of the dynamic focusing circuit.

FIG. 4 shows an alternative embodiment of the dynamic focusing circuit. The current supplying circuit 2 has an output which supplies the bias current Ib. A npn transistor T1 has a control input or base connected to the output of the current supplying circuit 2, a main electrode or collector c1 connected to a high supply voltage V+, and a main electrode or emitter e1 connected to an output 1 of the dynamic focusing circuit for supplying the dynamic focusing voltage Vf. A npn transistor T2 has a main electrode or collector c2 connected to a cathode of a diode D and to a control input or base b4 of a pnp transistor T4, a main electrode or emitter e2 connected to ground, and a control input or base b2 receiving the input waveform Vin. The diode D has an anode connected to the output of the current supplying circuit 2. The pnp transistor T4 has a main electrode or emitter e4 connected to the output 1, and a main electrode or collector c4 connected to ground. During the falling edge of the dynamic focusing voltage Vf, the npn transistor T2 withdraws current from the base b4 of the pnp transistor T4 to lower a voltage at the base of the pnp transistor T4. Consequently, the pnp transistor T4 and the diode D are conducting and the npn transistor T1 is non-conducting. The dynamic focusing voltage Vf decreases because the conducting pnp transistor T4 withdraws current from the focus electrode. During the flat part of the dynamic focusing voltage Vf, the npn transistor T1 is slightly conducting to allow the bias current Ib to flow back to the current supplying circuit 2. During the rising edge of the dynamic focusing voltage Vf, the npn transistor T2 withdraws less current from the base of npn transistor T1. The npn transistor T1 supplies more current to the output 1 and the dynamic focusing voltage Vf increases. The pnp transistor T4 stops conducting. Again, the bias current Ib is generated in a very efficient way, and the first transistor T1 is conducting at the beginning of the rising edge of the focusing voltage Vf.

While the invention has been described in connection with preferred embodiments, it will be understood that modifications thereof within the principles outlined above will be evident to those skilled in the art, and thus the invention is not limited to the preferred embodiments but is intended to encompass such modifications. It is possible to replace the transistors of a certain conductivity type with transistors of the other conductivity type. It is also possible to use field effect transistors instead of bipolar transistors. The invention has been described on the basis of a dynamic focusing voltage Vf with a falling edge, an almost flat part, and a rising edge. It should be noted that it is also possible to generate a dynamic focusing voltage Vf with a rising edge, an almost flat part and a falling edge. It is also possible to generate a dynamic focusing voltage with a negative instead of a positive potential. All these adaptations fall within the normal skills of a skilled person.

Any reference signs in the following claims should not be construed as limiting the claims.

We claim:

1. A dynamic focusing circuit comprising:

an output (1) for supplying a dynamic focusing voltage (Vf) to a focus electrode of a cathode ray tube (CRT), a first transistor (T1) having a main current path (c1, e1) coupled between a supply voltage (V+) and said output (1), and a control input (b1), a current supplying means (2) coupled to said control input (b1) for supplying a bias current (Ib), and a second transistor (T2) with a control electrode (b2) coupled to receive an input voltage (Vi) related to a parabolically shaped input waveform (Vin), and a main terminal (c2) coupled to said control input (b1) for withdrawing current (Id) from said control input (b1), characterized in that the current supplying means (2) comprise:

an arrangement of a secondary winding (Ls) of a transformer (T) and a current determining means (12), said arrangement (Ls, 12) being coupled between said control input (b1) and said output (1).

2. A dynamic focusing circuit as claimed in claim 1, characterized in that the secondary winding (Ls) has a first terminal (10) coupled to said output (1), and a second terminal (11) coupled to said control input (b1) via the current determining means (12).

3. A dynamic focusing circuit as claimed in claim 1, characterized in that the dynamic focusing circuit further comprises a differential amplifier (3) with a first input for receiving the parabolically shaped input waveform (Vin), a second input for receiving a feedback signal related to the dynamic focusing voltage (Vf), and an output coupled to the control input (b2) of the second transistor (T2).

4. A dynamic focusing circuit as claimed in claim 2, characterized in that the current determining means (12) comprise a third transistor (T3) with a main current path (e3, c3) coupled between the second terminal (11) of said secondary winding (Ls) and said control input (b1), and a control input (b3) coupled to a voltage divider (R1,R2,D4, R3) being coupled between the first (10) and the second (11) terminal of said secondary winding (Ls) for obtaining a current source supplying the bias current (Ib).

5. A dynamic focusing circuit as claimed in claim 4, characterized in that the current determining means (12) further comprise a capacitor (C2) arranged between a tap of the voltage divider (R1,R2,D4,R3) and a reference potential for increasing the bias current (Ib) during a rising edge of the focusing voltage (Vf).

6. A dynamic focusing circuit as claimed in claim 1, characterized in that the transformer (T) has a primary winding (Lp) arranged to receive a line deflection related current or voltage.

7. A display apparatus comprising:
- a cathode ray tube (CRT) for displaying a display signal (Ds),
- a deflection circuit (Dc) for generating deflection drive signals (Dd1, Ddf) driving deflection coils (L1,Lf) for deflecting an electron beam in the cathode ray tube (CRT),
- a signal processing means (Sac) for processing incoming display information (Idi) to obtain the display signal (Ds) suitable to drive the cathode ray tube (CRT),
- a synchronisation means (Sc) for generating synchronisation signals (S) being supplied to the deflection circuit (Dc) for synchronising the deflection drive signals (Dd1,Ddf) with the display signal (Ds),
- a dynamic focusing circuit comprising:
    - an output (1) for supplying a dynamic focusing voltage (Vf) to a focus electrode of the cathode ray tube (CRT),
    - a first transistor (T1) having a main current path (c1, e1) coupled between a supply voltage (V+) and said output (1), and a control input (b1),
    - a current supplying means (2) coupled to said control input (b1) for supplying a bias current (Ib), and
    - a second transistor (T2) with a control electrode (b2) coupled to receive a parabolically shaped input waveform (Vin), and a main terminal (c2) coupled to said control input (b1) for withdrawing current (Id) from said control input (b1), characterized in that the current supplying means (2) comprise:
- an arrangement of a secondary winding (Ls) of a transformer (T) and a current determining means (12), the arrangement (Ls, 12) being coupled between said control input (b1) and said output (1).

* * * * *